Figure 1:
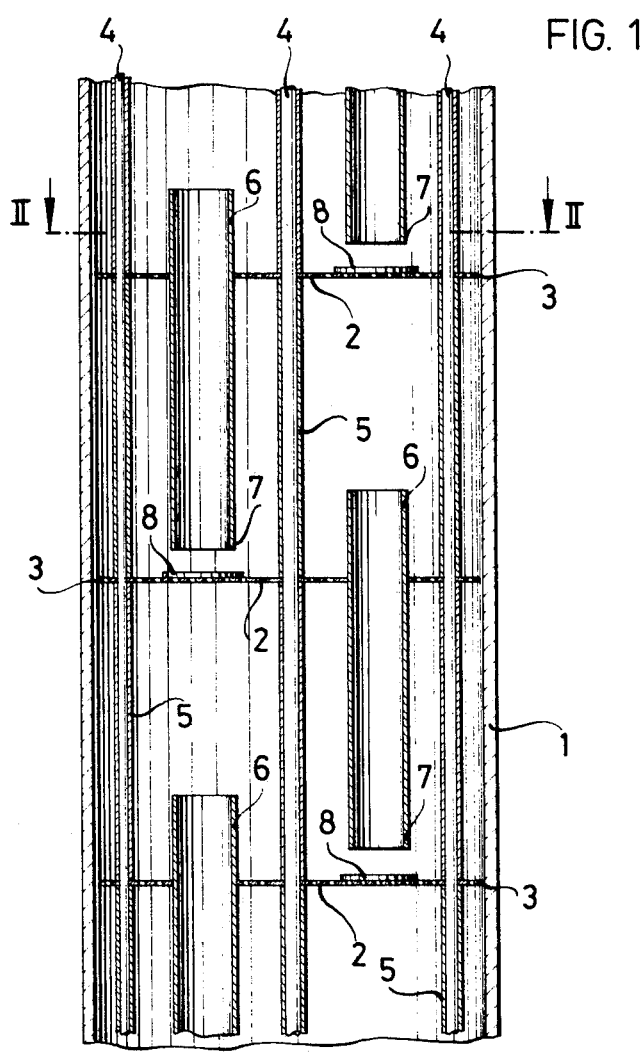

United States Patent [19]

Kuxdorf et al.

[11] 4,062,662
[45] Dec. 13, 1977

[54] DEGASSING COLUMN

[75] Inventors: Bernhard Kuxdorf; Karl Kaiser, both of Bruhl; Kurt Wissel, Wesseling-Urfeld, all of Germany

[73] Assignee: Hoechst Aktiengesellschaft, Frankfurt am Main, Germany

[21] Appl. No.: 739,580

[22] Filed: Nov. 8, 1976

[30] Foreign Application Priority Data

Nov. 7, 1975   Germany ............................ 2550023
Sept. 9, 1976   Germany ............................ 2640592

[51] Int. Cl.² ............................................. B01D 19/00
[52] U.S. Cl. ...................................... 55/206; 261/113
[58] Field of Search ........................... 55/38, 52, 206; 261/113

[56] References Cited

U.S. PATENT DOCUMENTS

| 368,208 | 8/1887 | Harris | 261/113 |
|---|---|---|---|
| 1,790,224 | 1/1931 | Campbell | 55/206 |
| 2,647,856 | 8/1953 | Grunewald et al. | 261/113 X |
| 3,367,638 | 2/1968 | Leva | 261/113 |
| 3,446,489 | 5/1969 | Leva | 261/113 X |

Primary Examiner—Frank A. Spear, Jr.
Assistant Examiner—R. W. Burks
Attorney, Agent, or Firm—Connolly and Hutz

[57] ABSTRACT

In a degassing column with several perforated plates arranged over one another and at a distance from one another in a column housing there is left free, between each plate and the column housing, a gap which is as small as possible and is uniform over the periphery, and the apertures in the plates have a diameter of less than 5 mm. Each plate is penetrated by at least one eccentrically arranged draining shaft, and at least one eccentrically arranged feed shaft ends above each plate. Finally, below each feed shaft on the plate an area is impermeable which is at least as large as the cross-section of the feed shaft.

15 Claims, 4 Drawing Figures

DEGASSING COLUMN

The present invention relates to a degassing column, wherein a plurality of perforated plates, which are arranged serially, i.e. with one downstream of another, and spaced apart from one another, are accomodated in the column shell, and to the use of the degassing column for the removal of monomers from polymer dispersions.

The exchange of constituents between liquid and gaseous phases is known to occur so rapidly that it is possible in distillation columns, to use plates predominantly of low weir heights. Low weir heights effect a relatively low pressure loss which, however, is highly desirable, especially in those cases where temperature-sensitive substances, are concerned, inasmuch as it is possible for the column base to be operated at relatively low temperatures. A factor to consider in the case of liquids containing solid matter is the residence time on the plates since the substance transition processes which occur between solid, liquid and gas are determined by the laws of diffusion.

In those cases in which a distillation column provided with so-called rain sieve plates, such as that described in German Specification "Auslegeschrift" 2,027,655, is used, the residence time on the plates can, however, only be varied within narrow limits by an appropriate selection of the free cross-section portion, the effective loading region being extremely narrow. As a result, it is substantially impossible to effectively use a sieve plate column for removing a volatile component from a solid substance present in aqueous dispersion.

It is therefore an object of the present invention to provide a column in which the residence time on the plates can be varied within wide limits and in which solid material is not likely to deposit on the plates. To achieve this the invention provides for a reasonably small gap uniform in width over the entire periphery to be left between each plate and the column shell; for the perforations in the plates to have a diameter of less than 5 mm; for each plate to be penetrated by at least one eccentrically arranged draining shaft; for at least one eccentrically arranged feed shaft to terminate above each plate; and for an impermeable surface at least as large as the cross-section of the feed shaft to be provided below each feed shaft on the plate.

Further preferred features of the degassing column of the present invention provide:

a. for the gap to have a width of at most 3 mm, preferably 1 mm;
b. for the draining shaft to have a circular cross-section;
c. for the feed shaft to have a circular cross-section;
d. for each plate to be penetrated by one to eight draining shafts;
e. for each plate to be penetrated by two to four draining shafts;
f. for one to eight feed shafts to terminate above each plate;
g. for two to four feed shafts to terminate above each plate;
h. for the impermeable surface on the plate to have an area one to two times the cross-section area of the feed shaft;
i. for the impermeable surface to have an area 1.4 to 1.6 times the cross-section area of the feed shaft;
j. for the distance between the upper end of the draining shaft and the pertinent plate to be 80 to 400 mm;
k. for the distance between the upper end of the draining shaft and the pertinent plate to be 100 to 150 mm;
l. for the distance between the lower end of the feed shaft and the plate present thereunder to be 10 to 100 mm;
m. for the distance between the lower end of the feed shaft and the plate present thereunder to be 25 to 40 mm;
n. for the perforations in the plates to have a diameter of 2 to 3 mm;
o. for the ratio of the diameter of the perforations in the plate to the thickness of the plate to be 0.5 to 2.5;
p. for the ratio to be 1 to 2;
q. for the plates to be penetrated by several stay bolts, the stay bolts between two adjacent plates being in each instance surrounded concentrically by a sleeve;
r. for the plates to be supported by wedge mountings secured all around the inner wall of the column housing.

The present degassing column may also be used for removing monomers from polymers present in dispersion, preferably in aqueous dispersion, in particular from polyvinyl chloride. The dispersion may have a polymer content of 1 to 60% by weight, preferably 20 to 40% by weight.

The present degassing column generally permits a liquid-solid mixture to be so effectively gassed that it continues to remain a homogeneous mixture. At those places in the column where this is not possible, it is necessary to ensure a certain minimum flow rate for the dispersion.

Thus, the flow speed in the draining shaft, in the feed shaft and in the inflow region between the plate and the feed shaft should be 0.01 to 0.2 m/s, in particular 0.05 to 0.15 m/s.

In clear contrast with the distillation columns described heretofore, in which the target is to provide for a high gas load and in which the free cross-section portion of the plates is 8 to 15%, it is the object of the present degassing column to provide for a gas load as low as possible with a free cross-section portion of the plates of less than 8%, preferably less than 6%. In order to translate such small free cross-section portions into reality and simultaneously to keep the dispersion in homogeneous mixture, it is necessary for the perforations of the plates to have a diameter of less than 5 mm, and for the individual perforation rows to be spaced apart at relatively large intervals.

The plates of the present degassing column are fully perforated all around the draining pipe and up to the column shell. Only in the region of the liquid feed on to the plate is there an impermeable surface, which is at least as large as the cross-section of the feed shaft. To this end, the respective part of the plate is left unperforated, or a covering sheet of metal is placed on that part of the plate. As a result of the uniform apertures provided in the plates in the draining region and the eccentric arrangement of the drawing shaft, it is possible for the latter to become uniformly charged with dispersion. This avoids the formation of dead spaces, where solid matter would be likely to accumulate.

The degassing column of the present invention has plates which are highly effective under loads of 15 to 100%, i.e. with plates which have a wide effective loading range. In addition to this, it is possible for the degassing column to be operated with area loadings of up to 35 m³ of dispersion per m² of plate area per hour; the dispersion may well contain particulate solid matter with a particle size which corresponds to the distance from the lower edge of the feed shaft to the plate.

The height of the degassing column should be 5 to 20 times, preferably 7.5 to 15 times, greater than its diameter.

The degassing column of the present invention permits the residence time to be selected as desired by changing the so-called weir height, i.e. the distance between the upper edge of the draining shaft and the plate. More specifically, it is possible to use weirs with a height of 80 to 400 mm, preferably 80 to 250 mm, more preferably 100 to 150 mm.

The degassing column may comprise 10 to 30 plates, preferably 15 to 25 plates, which may be spaced apart from one another at intervals of 200 to 600 mm, preferably 250 to 350 mm.

The effective gas speed in the present degassing column is 0.17 to 1.5 m/s, preferably 0.35 to 0.9 m/s.

It is advisable for the present degassing column to be designed so resistant to pressure that a vacuum of up to 0.5 bar and a pressure of up to 5 bars can be maintained in it. A further advantageous feature of the present degassing column provides for the diameter of the draining shaft and feed shaft to be 13 to 23% of the column diameter, and for the cross-section ratio of draining shaft and feed shaft to the column diameter to be 4 to 15%, preferably 5 to 10%.

Figure 2:
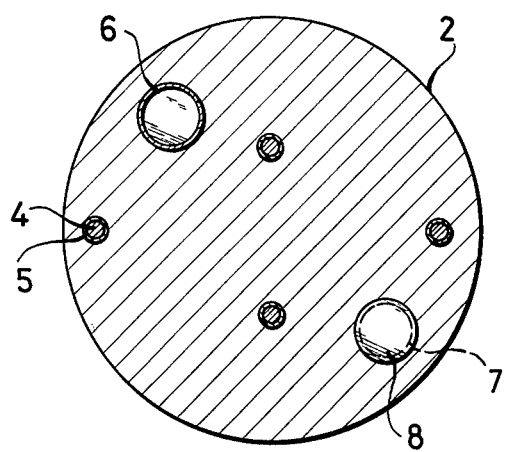
Figure 3:
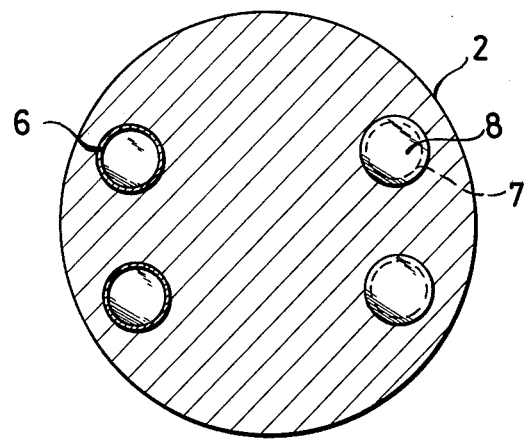
Figure 4:
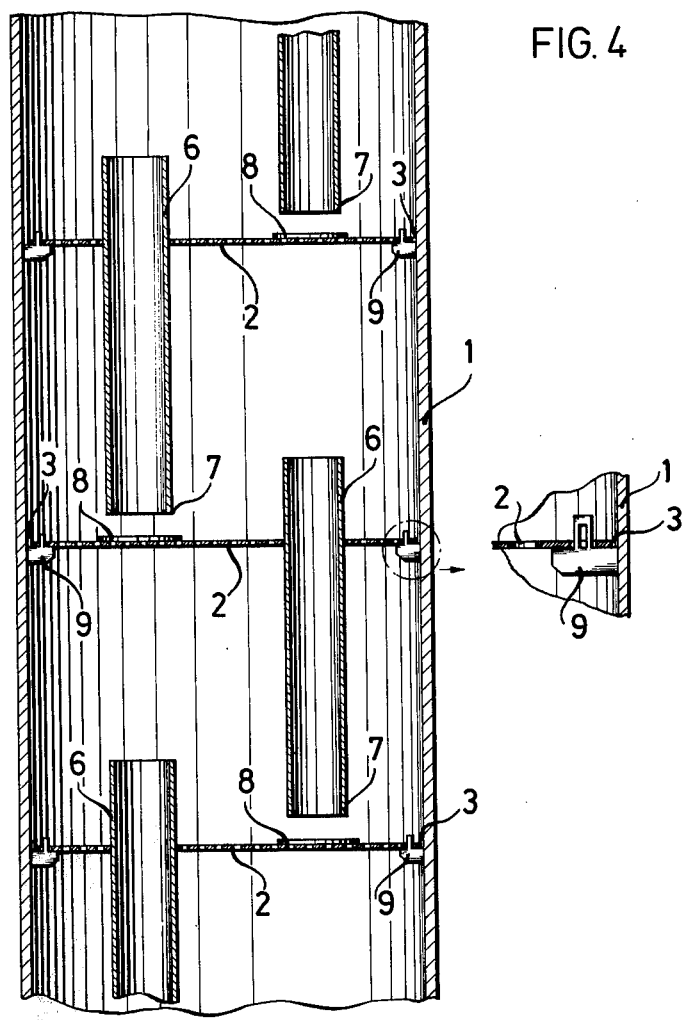

An exemplary embodiment of the present invention is shown diagrammatically in the accompanying drawing of which FIG. 1 is a side-elevational view of one embodiment of the degassing column, FIG. 2 is a plan view of a plate taken along line II—II of FIG. 1, FIG. 3 is a plan view of a modified plate, and FIG. 4 is a side-elevational view of another embodiment of the degassing column.

As can be seen, a plurality of apertured plates 2 are serially arranged, i.e. with one downstream of another, in a column shell 1 (the apertures have a diameter of 2 mm); between each plate 2 and the column shell 1, there is left a gap 3 of about 1 mm, uniform over the periphery. An eccentrically arranged feed shaft 7 terminates above each plate 2, while each plate 2 is penetrated by an eccentrically arranged draining shaft 6. Below the feed shaft 7 there is a covering metal sheet 8 on the plate 2. The weir height, i.e. the distance between the upper end of the draining shaft 6 and the plate 2, is 120 mm, while the distance between the lower end of the feed shaft 7 and the plate 2 is 25 mm.

In FIG. 1, the plates 2 are penetrated by four stay bolts 4. The stay bolts 4 are, in each instance between two adjacent plates 2, surrounded concentrically by a sleeve 5 on which lies the upper plate 2, while the sleeve 5 supports itself with its lower end on the lower plate 2.

In FIGS. 2 and 3, the hatched areas of the plates 2 are perforated.

The plates shown in FIG. 3 with several draining shafts 6 and sheet-metal covers 8 are advantageously used for degassing columns with larger diameters.

In FIG. 4, the plates 2 are supported by wedge mountings 9 secured all around on the inner wall of the column shell 1.

We claim:

1. A degassing column for removing monomers from polymers present in dispersions comprising a vertically elongated tubular shell provided with a plurality of substantially horizontally disposed apertured plates; said plates being vertically spaced within and attached to the inner surface of said shell; each of said plates being penetrated by at least one eccentrically arranged conduit comprising a draining shaft in the upper portion thereof and a feed shaft in the lower portion below the penetrated plate; degassing column wherein the apertures in said plates have a diameter of less than 5 mm; each plate is supported by a plurality of wedge mountings and is wedged therewith, said wedge mountings being fastened around the inner surface of said shell; a small gap uniform in width over the periphery is left between each plate and said shell; the distance between the upper end of each conduit and the plate penetrated by it is 80 to 400 mm; the distance between the lower end of each conduit and the next plate arranged below it is 10 to 100 mm; and a surface portion of each apertured plate underneath each conduit is impermeable; said impermeable surface portion being one to two times the cross-sectional area of the conduit.

2. The degassing column as claimed in claim 1, wherein the impermeable surface portion is provided by a metal sheet secured to the plate.

3. The degassing column as claimed in claim 1, wherein the gap has a width of at most 3 mm.

4. The degassing column as claimed in claim 3, wherein the gap is 1 mm wide.

5. The degassing column as claimed in claim 1, wherein the draining shaft and the feed shaft have circular cross-section.

6. The degassing column as claimed in claim 1, wherein each plate is penetrated by one to eight draining shafts.

7. The degassing column as claimed in claim 6, wherein each plate is penetrated by two to four draining shafts.

8. The degassing column as claimed in claim 1, wherein one to eight feed shafts terminate above each plate.

9. The degassing column as claimed in claim 8, wherein two to four feed shafts terminate above each plate.

10. The degassing column as claimed in claim 1, wherein the impermeable area is 1.4 to 1.6 times the cross-section area of the feed shaft.

11. The degassing column as claimed in claim 1, wherein the distance between the upper end of the draining shaft and the pertinent plate is 100 to 150 mm.

12. The degassing column as claimed in claim 1, wherein the distance between the lower end of the feed shaft and the plate present thereunder is 25 to 40 mm.

13. The degassing column as claimed in claim 1, wherein the apertures in the plates have a diameter of 2 to 3 mm.

14. The degassing column as claimed in claim 1, wherein the ratio of the diameter of the apertures in the plate to the thickness of the plate is 0.5 to 2.5.

15. The degassing column as claimed in claim 14, wherein the ratio is 1 to 2.

* * * * *